United States Patent Office 3,377,237
Patented Apr. 9, 1968

3,377,237
PROCESS FOR COMBATTING INSECTS WITH DISULFUR DECAFLUORIDE FUMIGANT
Richard E. Eibeck, Convent Station, N.J., assignor to Allied Chemical Corporation, New York, N.Y., a corporation of New York
No Drawing. Filed Mar. 9, 1966, Ser. No. 532,864
2 Claims. (Cl. 167—20)

ABSTRACT OF THE DISCLOSURE

The specification discloses a method of combatting insect pests by subjecting the same to vapors of disulfur decafluoride, $S_2F_{10}$.

---

This invention relates to the use of disulfur decafluoride as a fumigant and, more particularly, to a process for combatting noxious pest organisms.

Control of pest organisms which infest various hosts such as grain, fruits, vegetables, soil, textiles and the like is extremely difficult, particularly in those cases where the pest organisms penetrate deeply into the interior of the host space. In such cases, the effectiveness of surface poisons or pesticides is seriously impaired because of the difficulty in reaching the interior of the space. Although various fumigants have been proposed for controlling such pests, there is a need for new and highly effective fumigants.

Accordingly, it is an object of the present invention to provide a method of combatting pests, particularly insects, by subjecting said pests to the action of a pesticide which is capable of thoroughly permeating the host space and capable of exterminating all forms of the pest population.

It has now been discovered that disulfur decafluoride is an outstanding fumigant exerting extremely lethal effects against common penetrating pests such as those infesting grain, flour, rugs, plants, etc.

Disulfur decafluoride, $S_2F_{10}$, is a chemically and thermally stable colorless liquid having a boiling point of approximately 29° C. at 760 millimeters pressure. This compound may be prepared by methods known in the art such as by the photochemical reduction of sulful chloride pentafluoride with hydrogen. Disulfur decafluoride is also obtained as a by-product from the commercial manufacture of sulfur hexafluoride by reaction of sulfur with elemental fluorine.

In the process of the present invention, control of many noxious pests such as insects can be effected by treating the locus of the pests, i.e., the pests themselves, their environment, their food or their host, such as insect infested grains, flours, plants, soils, etc., with an effective amount of the desulfur decafluoride fumigant of the invention. Although the process is particularly effective for control of grain infesting insects, such as the various meal worms and flour beetles, other pests such as mites, flies, roaches, etc., may be likewise controlled thereby. The pests combatted may be in adult, nymph, larval or egg form.

The pests are subjected to a toxic concentration of disulfur decafluoride according to well-established methods known in the art. The toxicant may be applied to the locus "as is" or in a variety of pesticidal compositions. According to a typical method, the toxicant is contacted with the locus of the pests is such manner that it is free to volatilize and permeate the atmosphere.

When fumigating grain, the grain is placed in an enclosure together with an effective amount of the compound. In such operations, the compound may be introduced directly into the enclosure or at various levels within the stored grain. In the fumigation of bagged products such as flour or other milled grain products, these packaged materials are placed in an enclosure together with an effective amount of disulfur decafluoride. Exposure of the infested locus may likewise be carried out in an atmosphere other than air, for example, carbon dioxide or nitrogen.

If desired, the toxicant can be supplied in the form of a spray employing solutions or emulsions of the toxicant in organic solvents and/or in water. Carbon tetrachloride, perchloroethylene, chloroform and deodorized oils such as kerosene, xylene and methylated naphthalenes are illustrative organic solvents employable. An alternative method of application of the toxicant compound involves incorporation thereof in aerosol formulations, i.e. mixtures of the compound with a liquid of low boiling point that becomes a gas when released from a confined space. Suitable volatile diluents of this type include acetone, halogenated hydrocarbons such as hexafluoroethane, tetrafluoroethane, dichlorodifluoromethane, trifluoromethane and pentachlorofluoroethane. The concentration of the disulfur decafluoride compound employed in these compositions is not critical. An effective dosage of the disulfur decafluoride compound generally may be supplied with compositions containing from about 25 to 90% by weight of toxicant.

The exposure of the pests to at least a minimum effective dosage of the disulfur decafluoride of the invention is required for the practice of the present invention. In general, when the disulfur decafluoride fumigant is employed to combat insects inhabiting an enclosed space, a dosage of about $\frac{1}{32}$ to 2, preferably about $\frac{1}{16}$ to 1 pound of the toxicant per 1000 cubic feet of the enclosed space is generally adequate to saturate the area and to insure effective control of the insects. The exposure time required depends upon the size of the enclosed area and the type of host, for example flour or grain in the area. In an area of 1000 cubic feet, the time normally required for most effective fumigation is from about 24 to 48 hours. In larger areas, such as grain elevators, desirable fumigation time may be about 24 to 72 hours.

The effectiveness of disulfur decafluoride as a fumigant is illustrated by the tests described in the following example.

EXAMPLE

Disulfur decafluoride was tested as a fumigant against confused flour beetle adults (*Tribolium confusum*), lesser meal worm larvae (*Alphitobius diaperimus*) and black carpet beetle larvae (*Attagenus piceus*). All tests were run under substantially identical conditions. In conducting these tests, tins having perforated lids and containing the insects and small amounts of appropriate food such as grain or flour were placed in gallon mason jars. The toxicant was introduced onto a cellucotton wad placed in the jars in such quantities to give a concentration of vapor in the jar indicated in Table I below. The jars were sealed and the insects exposed to the toxicants for about a 24 hour period. The insect controls were removed and organisms then examined for percent mortality five days after exposure. Results of these tests are set forth in Table I below:

TABLE I

| Compound | Dosage (per gallon) | Confused Flour Beetle Adults | Lesser Meal Worm Larvae | Black Carpet Beetle Larvae |
|---|---|---|---|---|
| | | Percent Mortality | | |
| Disulfur decafluoride | 0.00625 gm.[1] | 100 | 100 | 100 |
| Do | 0.003 gm | 40 | 100 | 100 |
| "Ethide"[2] | 0.00625 cc | 40 | 100 | 0 |
| Do | 0.003 gm | 0 | 0 | 0 |
| Control | | 0 | 0 | 0 |

[1] Supplied in an ampoule.
[2] A commercial fumigant containing 1,1-dichloronitroethane.

It is evident from the above table that the fumigant compound of the present invention is at least as toxic or more toxic to insects at equivalent dosages than commercially available fumigant compounds.

Since various changes and modifications may be made in the invention without departing from the spirit thereof, it is intended that all matter contained in the above description shall be interpreted as illustrative and not in a limiting sense.

I claim:
1. The process for combatting insects which comprises subjecting said insects to the action of an effective amount of disulfur decafluoride.
2. The process for combatting insects which comprises subjecting said insects to the action of an effective amount of disulfur decafluoride in an enclosed space.

References Cited

UNITED STATES PATENTS 2,840,457  6/1958  Burg et al. _____ 23—205

OTHER REFERENCES

Greenberg et al.: Chem. Abstracts, 1950, vol. 44, pp. 10143. QD1A51.

ALBERT T. MEYERS, *Primary Examiner.*

D. R. MAHANAND, *Assistant Examiner.*